United States Patent [19]

Asano et al.

[11] Patent Number: 4,467,407

[45] Date of Patent: Aug. 21, 1984

[54] MULTI-LEVEL INVERTER

[75] Inventors: Katsuhiro Asano, Toyoake; Norio Iwama, Ama, both of Japan

[73] Assignee: Kabushiki Kaisha Toyota Chuo Kenkyusho, Aichi, Japan

[21] Appl. No.: 442,153

[22] Filed: Nov. 16, 1982

[30] Foreign Application Priority Data

Dec. 25, 1981 [JP] Japan .............................. 56-215259

[51] Int. Cl.³ .......................................... H02M 1/14
[52] U.S. Cl. ................................................ 363/43
[58] Field of Search ........................................ 363/43

[56] References Cited

U.S. PATENT DOCUMENTS 3,100,851 8/1963 Ross et al. ...................... 363/43 X
4,135,235 1/1979 Baker ................................. 363/43

OTHER PUBLICATIONS

"Generalized Structure of a Multilevel PWM Inverter", Pradeep Bhagwat & V. R. Stefanovic, IAS Annual Meeting, Cincinnati, Ohio, Sep. 28, 1980–Oct. 3, 1980.

Primary Examiner—William M. Shoop
Attorney, Agent, or Firm—Parkhurst & Oliff

[57] ABSTRACT

The multi-level inverter according to the present invention comprises: a group of DC power supplies including three or more DC power supplies which are connected in series with same polarities, a group of terminals including a plurality of terminals for taking desired voltage levels from the opposite end and respective connecting points of group of DC power supplies, a group of switches consisting of switches having open modes and short-circuit modes equal in number to the terminals in the group of the terminals, with respective terminals on the input side being connected to the terminals in the group of terminals and respective terminals on the output side being commonly interconnected, and output terminals connected to the terminals on the output side being commonly interconnected in the group of switches. A contact of a switch connected to a terminal corresponding to desired voltage levels is closed to output voltages at multi-levels to be applied to a load.

13 Claims, 17 Drawing Figures

MULTI-LEVEL INVERTER

BACKGROUND OF THE INVENTION

1. Field of the Invention

This invention relates to a multi-level inverter wherein three or more voltage levels are varied gradually to effect pulse amplitude modulation (hereinafter referred to briefly as "PAM") control.

2. Description of the Prior Art

The multi-level inverter contemplates that three or more voltage levels are varied gradually to approximate stepped forms so as to effect PAM control. In addition, it is possible to effect pulse width modulation (hereinafter referred to briefly as "PWM") control between two voltage levels in the vicinity of the level changes. Because of this, the multi-level inverter can decrease the number of commutations and decrease harmonic frequency components, thus reducing switching losses. The extremely low harmonic frequency components in the current outputted from the multi-level inverter is advantageous in that, in driving an AC motor as a load, losses due to torque ripples and harmonic frequency contacts can be reduced to a considerable extent.

Heretofore, there have been published circuit arrangements of multi-level inverters of various types. One example thereof is shown in FIG. 1.

A pair of reference DC power supplies $E_1$ and $E_2$ such as batteries are connected in cascade connection to the multi-level inverter shown in FIG. 1. A set of capacitors $C_1$ and $C_2$ are connected in cascade connection to the power supplies $E_1$ and $E_2$, through the diodes $D_1$ and $D_2$ respectively. One of connecting points of the capacitors $C_1$ and $C_2$ is selectively connected to a positive or a negative pole of DC power supplies through a change-over switch $SW_1$. A load L is connected to a connecting point of the DC power sources $E_1$ and $E_2$ and a common connecting point of the change-over switch $SW_2$. The change-over switch $SW_2$ has a function of selectively connecting the load L to the positive or the negative pole of the group of capacitors. Here, the capacitors $C_1$ and $C_2$ have functions as being the reference DC power supplies, and the diodes $D_1$ and $D_2$ have functions as the charging paths for charging the respective capacitors. Voltages at multiple levels can be applied to the load L through the combination of changed-over polarities by the switches $SW_1$ and $SW_2$.

In the circuit shown in FIG. 1, operations in four modes are performed and output voltages are on four voltage levels. In a first mode, the switches are connected such that the load and the reference DC power supply $E_1$ form a closed loop (with $SW_1$ being at the lower side, and $SW_2$ at the upper side,) and applied to the load L is voltage $E_1$. Then, a closed loop is also formed by the reference DC power supplies $E_1$, $E_2$ and the capacitor $C_1$ and the capacitor $C_1$ is charged to $(E_1+E_2)$. A second mode is a condition, in which the switches are connected such that a closed loop is formed by the load, the reference DC power supply $E_1$ and the capacitor $C_1$, which has been charged to $(E_1+E_2)$, (with both $SW_1$ and $SW_2$ being at the upper side), and applied to the load L is a voltage of $(2E_1+E_2)$. A third and a fourth modes are conditions, in which the switches $SW_1$ and $SW_2$ are thrown into positions symmetrical with those in the first and the second modes. Namely, the capacitor $C_2$ operates in the same manner as with the capacitor $C_1$ in the first and the second modes, and output voltages come to be $-E_2$ and $(-2E_2-E_1)$.

FIG. 2 shows another example of the conventional multi-level inverter. The example shown in FIG. 2 is of such an arrangement that two sets of pairs of DC power supplies ($E_1$ and $E_2$, $E_3$ and $E_4$) are provided, and these power supplies are selectively combined by switches to obtain a plurality of modes without requiring the use of capacitors. In this case also, there exist the first through fourth modes depending on the positions of the switches in the same manner as with the inverter shown in FIG. 1, and applied to the load are voltage of four types including $(-E_2+E_3)$, $(E_1+E_3)$, $(E_1-E_4)$ and $(-E_2+E_4)$.

Now, in the second and fourth modes, in which the DC power supplies and the capacitors thus charged are interconnected in series and the voltage $(2E_1+E_2)$ or $(-2E_2-)$ is supplied to the load, in order for the arrangement shown in FIG. 1 to be able to neglect the lowering in the output voltage due to the discharge of the capacitors, it becomes necessary to use capacitors of high capacities, whereby the system becomes large-sized, thereby presenting problems in practical use.

On the other hand, when the DC power sources are batteries, the capacities of the batteries are divided as in the circuit shown in FIG. 2, and the batteries thus divided are used in lieu of the capacitors, so that the large-sized circuit arrangement can be avoided. However, there is the disadvantage that it is difficult to uniformly consume the respective batteries. Further, in the first and third modes, there are two batteries which are connected in series with opposite polarities, and the differential voltages are applied to the load, and hence, the batteries must perform the charging and discharging, respectively. In this instance, the output impedance is increased, thus resulting in lowered conversion efficiency. In maintenance, when the batteries are changed, the respective batteries must be individually charged because the batteries are dispersed in their positions. In replacing the batteries with new ones, the working efficiency is low, and moreover, there is the disadvantage that the batteries must be charged independently of one another because values of electric charges consumed are different from one battery to another when they are taken out.

Further, in the arrangements shown in FIGS. 1 and 2, such basic arrangements are adopted that there should necessarily be included mode change-over switches between the two sets of pairs of DC power supplies. For this, in any mode, it is required to use a multiplicity of electronic switches in the closed loop of current flowing through the load. Moreover, the number of electronic switches included in the closed loop is increased with the increase in number of the closed circuit cascade-connected. For this, due to the heat loss generated in the individual electronic switches, general loss in the inverter is increased, thus presenting the disadvantage of lowered conversion efficiency of the inverter.

SUMMARY OF THE INVENTION

One object of the present invention is to provide a multi-level inverter wherein a contact of a switch connected to a terminal corresponding to desired voltage levels is closed to output voltages at multi-levels, thereby enabling an improvement in the efficiency.

Another object of the present invention is to provide a multi-level inverter wherein a group of DC power supplies and group of switches are gathered, respectively, thereby enabling an improvement in operation.

A further object of the present invention is to provide a multi-level inverter wherein respective power supplies in a group of DC power supplies can be uniformly consumed.

The multi-level inverter according to the present invention comprises: a group of DC power supplies including three or more DC power supplies which are connected in series with same polarities, a group of terminals including a plurality of terminals for taking desired voltage levels from the opposite end and respective connecting points of the group of DC power supplies, a group of switches consisting of switches having open modes and short-circuit modes equal in number to the terminals in the group of the terminals, with respective terminals on the input side being connected to the terminals in the group of terminals and respective terminals on the output side being commonly interconnected, and output terminals connected to the terminals on the output side being commonly interconnected in the group of switches.

DETAILED DESCRIPTION OF THE INVENTION

Figure 1:
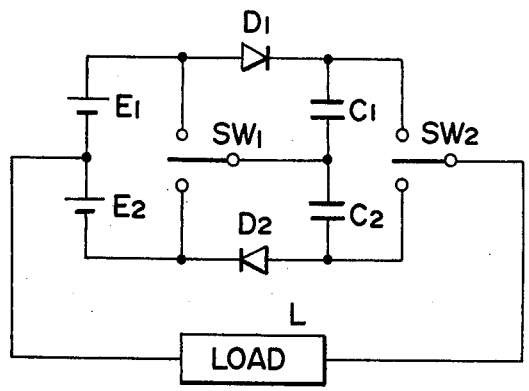
FIG. 1 is a circuit diagram showing one example of the conventional multi-level inverter.

In its working, the present invention can adopt the following aspects.

In the multi-level inverter of a first aspect according to the present invention, an output terminal or terminals are a terminal or terminals which are connected in parallel to output points of a group of switches commonly interconnected and equal in number to the number of a phase of a single phase load or phases of multi-phase load. The output terminal or terminals are connected thereto with the terminal or terminals of the phase or respective phases of the load, and a neutral point of the group of DC power supplies is connected to a terminal corresponding to the other terminal of the single phase load or a neutral point of the multi-phase load.

In the multi-level inverter of a second aspect according to the present invention, an output terminal or terminals are a terminal or terminals which are connected in parallel to output points of a group of switches commonly interconnected and equal in number to the twice the number of phase of a single phase or phases of a multi-phase load. When the load is of multi-phase, terminals in response to neutral points are divided into the respective phases and both terminals of the single phase load or the terminals of the respective phases of the multi-phase load and the terminals of the neutral point are connected to the aforesaid output terminals, respectively.

The multi-level inverter of a third aspect according to the present invention is suitable for the multi-phase load of three or more phases. The output terminals thereof are terminals which are connected in parallel to output points of the group of switches commonly interconnected and whose number equal to the number of phases of the multi-phase load. The terminals of respective phases of the multi-phase load are connected to the aforesaid output terminals, respectively.

The multi-level inverter of a fourth aspect according to the present invention is constituted by a plurality of multi-level inverters corresponding to any one of the first, second or third aspect, and the terminals on the input side of the aforesaid group of switches are connected to the aforesaid group of terminals of one group of DC power supplies.

The multi-level inverter of a fifth aspect according to the present invention is of such an arrangement that, out of the switches constituting the aforesaid group of switches, a switch connected to the highest voltage level and another switch connected to the lowest voltage level are each constituted by a thyristor having intrinsic turn-off capability gate-controlled and a diode connected in parallel to each other with opposite polarities.

The multi-level inverter of a sixth aspect according to the present invention is of such an arrangement that, out of the switches constituting the aforesaid group of switches, a switch connected to the highest voltage level and another switch connected to the lowest voltage level are each constituted by a transistor and a diode connected in parallel to each other with opposite polarities.

The multi-level inverter of a seventh aspect according to the present invention is of such an arrangement that, out of the switches constituting the aforesaid group of switches, switches connected to the voltage levels other than the highest and lowest voltage levels are each constituted by two thyristors having intrinsic turn-off capability gate-controlled connected in parallel to each other with opposite polarities.

The multi-level inverter of an eighth aspect according to the present invention is of such an arrangement that, out of the switches constituting the aforesaid group of switches, switches connected to the voltage levels other than the highest and lowest voltage levels are each constituted by two thyristors not having intrinsic turn-off capability gate-controlled connected in parallel to each other with opposite polarities.

The multi-level inverter of a ninth specific form according to the present invention is of such an arrangement that, out of the switch constituting the aforesaid group of switches, switches connected to the voltage levels other than the highest and lowest voltage levels are each constituted by two circuits, in which a transistor and a diode are connected in parallel to each other with opposite polarities, and the two circuits are connected in series with opposite polarities.

The multi-level inverter of a tenth specific form according to the present invention is of such an arrangement that, out of the switches constituting the aforesaid group of switches, switches connected to the voltage levels other than the highest and lowest voltage levels are each constituted by four diodes bridge-connected to one another, and whose output ends are each connected thereto with an emitter and a collector of a transistor.

The intrinsic advantages of the multi-level inverters of the first, second, third and fourth specific forms according to the present invention reside in that when current flows from the DC power supplies to the load, the current passes through only one switch and the number of switches is fewer than those in the prior art, so that loss in the inverter due to a voltage drop in the switches can be minimized, and moreover, the DC power supplies are not connected with their polarities reversed and only the DC power supplies required for output voltages are operated, so that the output impedance can be minimized, threby enabling to improve the conversion efficiency and to render the cooling device compact in size.

Further, the group of DC power supplies and the group of switces are gathered, respectively, and orderly and simply arranged as compared with those in the prior art, and hence, such an advantage can be offered the simplification of the wiring, the forming into modules of the group of switches and in the case of using batteries as the DC power supplies, the workability is improved at the time of charging and replacing.

Particularly, in the case of using vehicle-mounted batteries as the DC power supplies as in an electric motor vehicle, the rate of voltage drop in switches to the voltage of the power supplies becomes high because the voltage of the power supplies cannot be made high for the safety's sake. However, according to the present invention, the number of switches, through which current passes, is small as aforesaid, so that the voltage drop can be minimized. The compactness in size, simplification and improved workability are advantages, which cannot be overlooked in the field of electric motor cars. As compared with the multi-level inverters in the prior art, expansion of the voltage levels may be facilitated by increasing in number the terminals constituting the group of terminals of the group of DC power supplies and the switches constituting the group of switches.

Figure 3A:
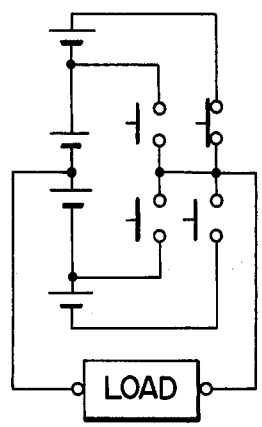
FIGS. 3(a), 3(b) and 3(c) are circuit diagrams showing a first aspect of the present invention.
Figure 3B:
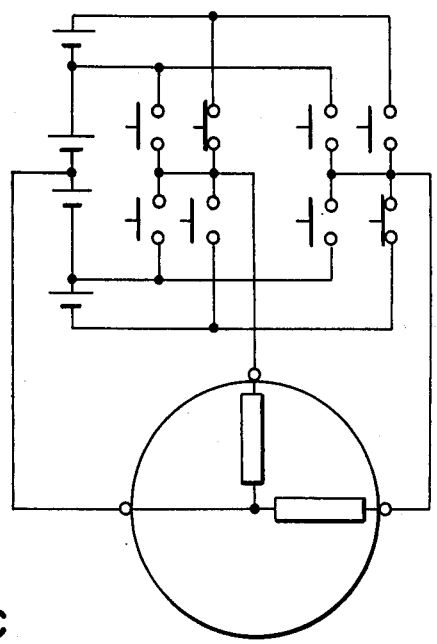
Figure 3C:
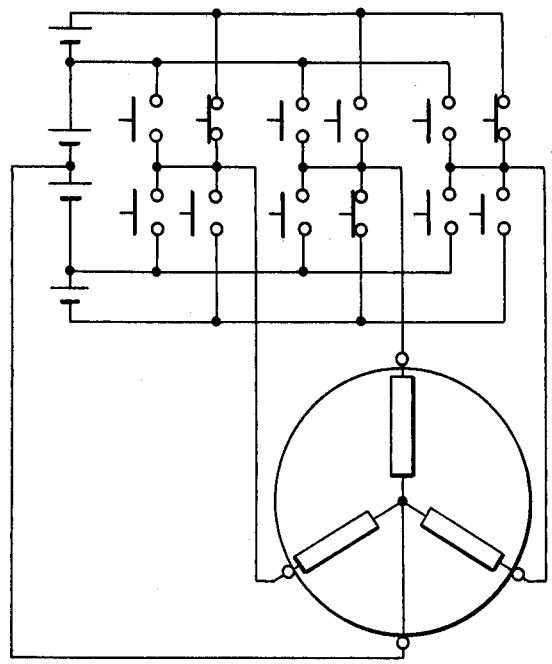

Examples, in which the multi-level inverter of the first aspect is connected to a single-phase load, a two-phase load and a three-phase load, respectively, are shown in FIGS. 3(a), 3(b) and 3(c). As apparent from the drawings, in the present examples, the number of switches in the group is least, thus reducing the production costs. Current of zero-phase-sequence components flows through a terminal corresponding to a neutral point with a multi-phase load of three phase or more to thereby increase the harmonic frequency components, however, if accurate control is performed, then it becomes possible to effect control in consideration of the influence of the hysteresis of an armature core of a motor.

Figure 4A:
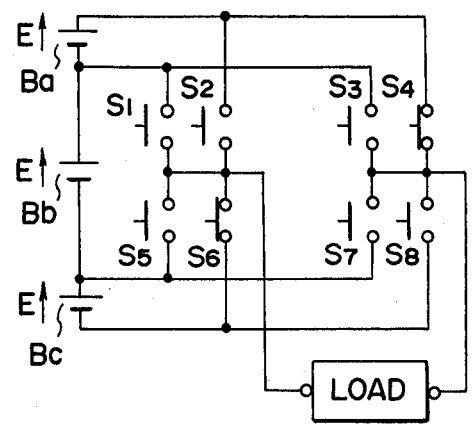
FIGS. 4(a), 4(b) and 4(c) are circuit diagrams showing a second aspect of the present invention.
Figure 4B:
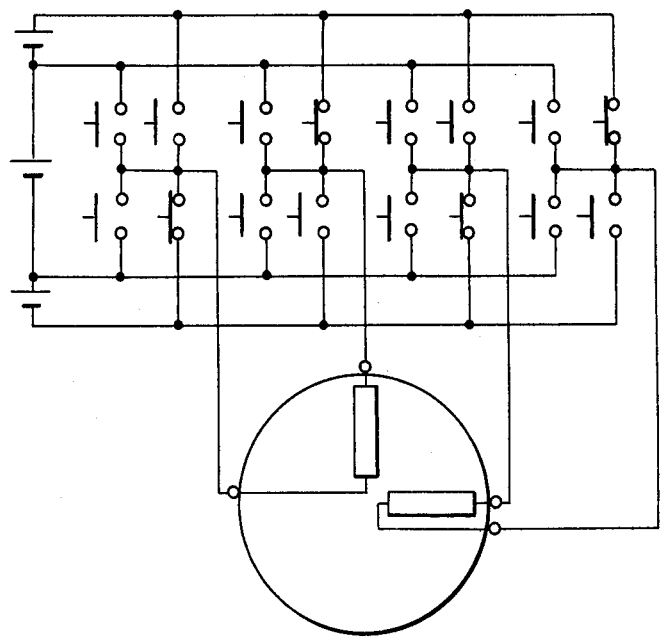
Figure 4C:
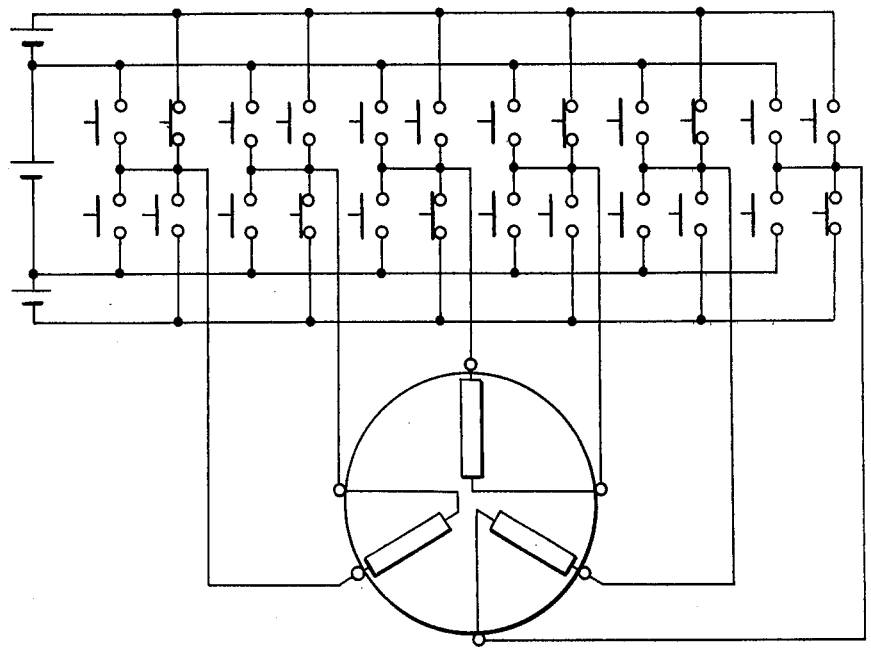

Examples, in which the multi-level inverter of the second aspect is connected to a single-phase load, a two-phase load and a three-phase load, respectively, are shown in FIGS. 4(a), 4(b) and 4(c). Like the first specific form, in the present examples, current of zero-phase-sequence component flows through a terminal corresponding to a neutral point with a multi-phase load of three phase or more to thereby increase the harmonic frequency components, however, if accurate control is performed, then it becomes possible to effect control in consideration of the influence of hysteresis of an armature core of a motor. The number of switches in the group is doubled, thus resulting in increased production costs. However, assumption is made that the number of voltage levels is four, and then, seven kinds of voltages including 3E, 2E, 1E, 0, −1E, −2E and −3E can be applied to the load. Namely, if the number of the voltage levels is N, the number of voltages actually applied to the load is (2N−1), which is substantially equivalent to the voltage levels increased to (2N−1).

Since the output voltage is doubled in value as compared with the first aspect, the rate of voltage drop of switches to the power voltage becomes one half time as much. For this, switches of two times as many as those in the first specific form work during operation, however, the total heat loss is on the same level as the first aspect, so that a high efficiency can be maintained.

Further, when the output voltage is not at the maximum, selection of a switch $S_1$, $S_2$, $S_3$ or $S_4$ to be used makes it possible to select only the DC power supply Ba as one to be used. In consequence, when the DC power supplies are batteries, suitable selection of a switch to be used makes it possible to use the batteries under a rotation system, so that the power supplies can be uniformly consumed. Accordingly, the maintenance of the batteries is facilitated.

When some of the batteries or switches are out of order, selection of the batteries or switches other than those out of order make it possible to continue the lowest necessary operation. The advantages described above relate to the most important characteristics of the electric motor vehicles.

Figure 5:
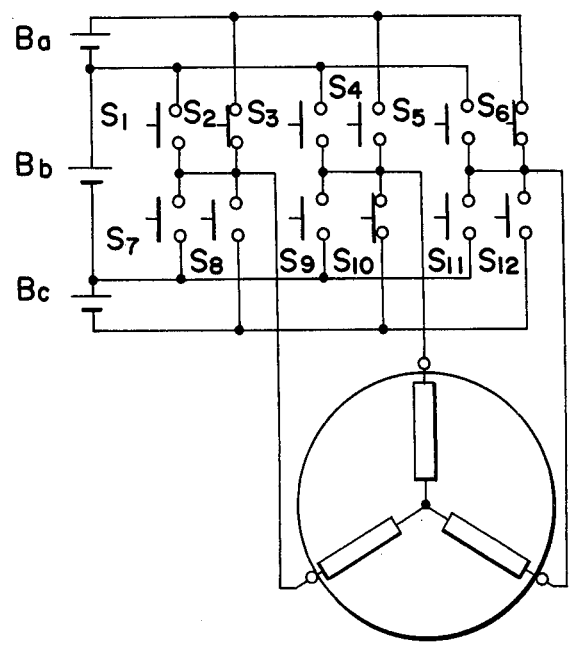
FIG. 5 is a circuit diagram showing a third aspect of the present invention.

An example, in which the multi-level inverter of the third aspect is connected to a three-phase load, is shown in FIG. 5.

In the present invention, the number of switches in the group is least like in the first specific form, thus resulting in decreased costs in production.

Since the neutral point of the load is not fixed, no current of zero-phase-sequence component flows therethrough, thus enabling to unconditionally remove a harmonic frequency as high as three times the basic harmonic frequency. Further, when the output voltage is not at the maximum like in the second specific form, selection of a switch $S_1$, $S_2$, $S_3$, $S_4$, $S_5$ or $S_6$ to be used makes it possible to select only the DC power supply Ba as one to be used. In consequence, when the DC power supplies are batteries, suitable selection of a switch to be used makes it possible to use the batteries under a rotation system, so that the power supplies can be uniformly consumed, thereby facilitating the maintenance of the batteries.

When some of the batteries or switches are out of order, selection of the batteries or switches other than those out of order makes it possible to continue the lowest necessary operation. The advantages described above relate to the most important characteristics of the electric motor vehicles.

Figure 6:
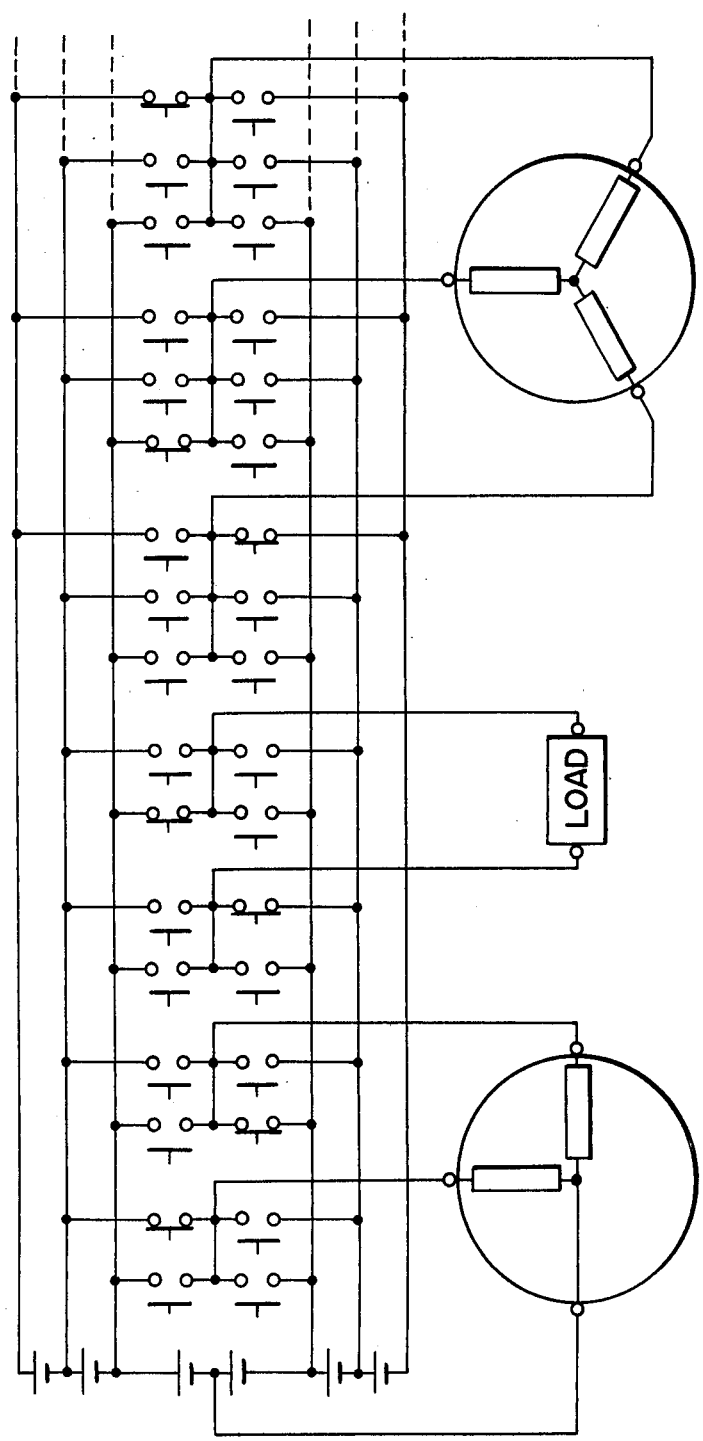
FIG. 6 is a circuit diagram showing a fourth aspect of the present invention.

FIG. 6 shows an example of the multi-level inverter of the fourth specific form. The multi-level inverter in the present example has the same advantages as the multi-level inverters of the first, second and third specific forms have, and further, the group of DC power supplies for only one multi-level inverter will do, so that the system can be simplified in construction.

When a four-wheel drive is effected in an electric motor vehicle having batteries as the DC power supplies, the present example is particularly advantageous. Furthermore, in the present example, a load of an auxiliary machinery can be connected to the group of DC supplies for one multi-level inverter, so that the system can be simplified in construction.

Detailed description will hereunder be given of the cases of the multi-level inverters for a single phase and a three phase with reference to the drawings.

Figure 7:
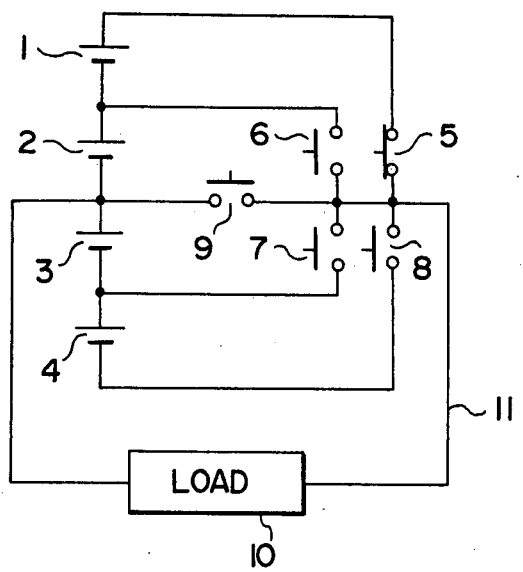
FIG. 7 is a circuit diagram showing a first embodiment of the present invention.

FIG. 7 is a circuit diagram showing the first embodiment of the present invention. This embodiment shown in the drawing is a multi-level inverter for a single phase, in which five voltage levels can be set. Four DC power supplies (for example, batteries) 1, 2, 3 and 4 are connected to one another in series, output terminals are taken out of opposite ends and connecting points of the DC power supplies, and switches 5, 6 and 7 and 8 are connected to the output terminals, respectively. Further, when the voltage levels are to be increased in number, it is only necessary to increase in number the DC power supplies, terminals and switches which are taken out therefrom. Terminals at one side of the respective switches are commonly connected to be formed into single pole switches, which in turn are connected to one side of a load 10 through a lead wire 11. The other side of the load 10 is connected to neutral point of the group of the DC power supplies. Here, closing a switch corresponding to a desired voltage level makes it possible to apply the voltage of four voltage levels to the load. At this time, since there exists only one switch in the closed loop, through which current for the load flows, the efficiency is improved irrespective of the voltage levels in use. Furthermore, due to low heat loss, the cooling system and the like are rendered compact in size, and further, the switches concentrated in one place are formed into modules, so that the section of the switches can be rendered compact in size. Additionally, since the section of the power supplies and the section of the switches are separated from each other, the circuit arrangement is simplified, so that workability during charging and replacement can be improved.

Figure 8:
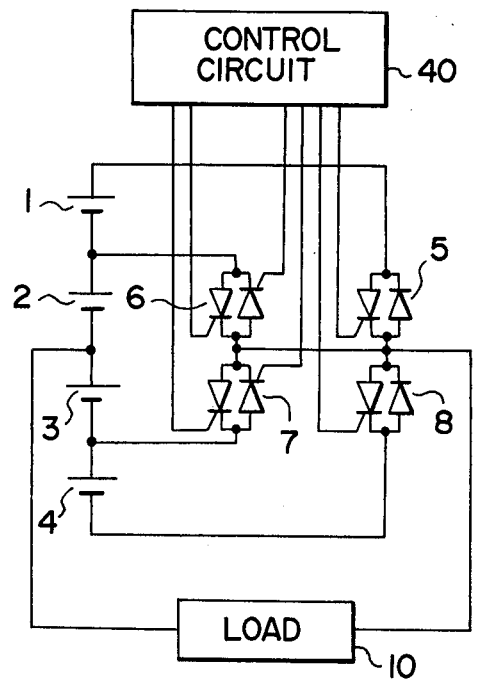
FIG. 8 is a detailed circuit diagram illustrating the embodiment shown in FIG. 7.

FIG. 8 is a circuit diagram detailedly showing the embodiment illustrated in FIG. 7. However, the voltage levels corresponding to the neutral points of the DC power supplies and the switches connected thereto are omitted in description. Semi-conductor elements such as gate turn-off thyristors are used as the switches 5 through 8, gate control of which is performed by a control circuit 40. Other respects in arrangement are identical with those shown in FIG. 7, so that description thereof will be omitted. The switches 5 and 8 to be connected to the highest voltage level and the lowest voltage level are each formed by connecting a gate turn-off thyristor and a diode to each other in anti-parallel, and the switches 6 and 7 other than the aforesaid switches are each formed by connecting two gate turn-off thyristors to each other in anti-parallel. Timing of the firing signal applied to gate is determined such that the control circuit 40 is driven so as to obtain a desired output voltage. Use of the gate turn-off thyristors as the switches 5 through 8 makes it possible to perform commutation at high speed. Those which have intrinsic turn-off capability gate-controlled are usable as the switches 5 through 8.

Figure 9:
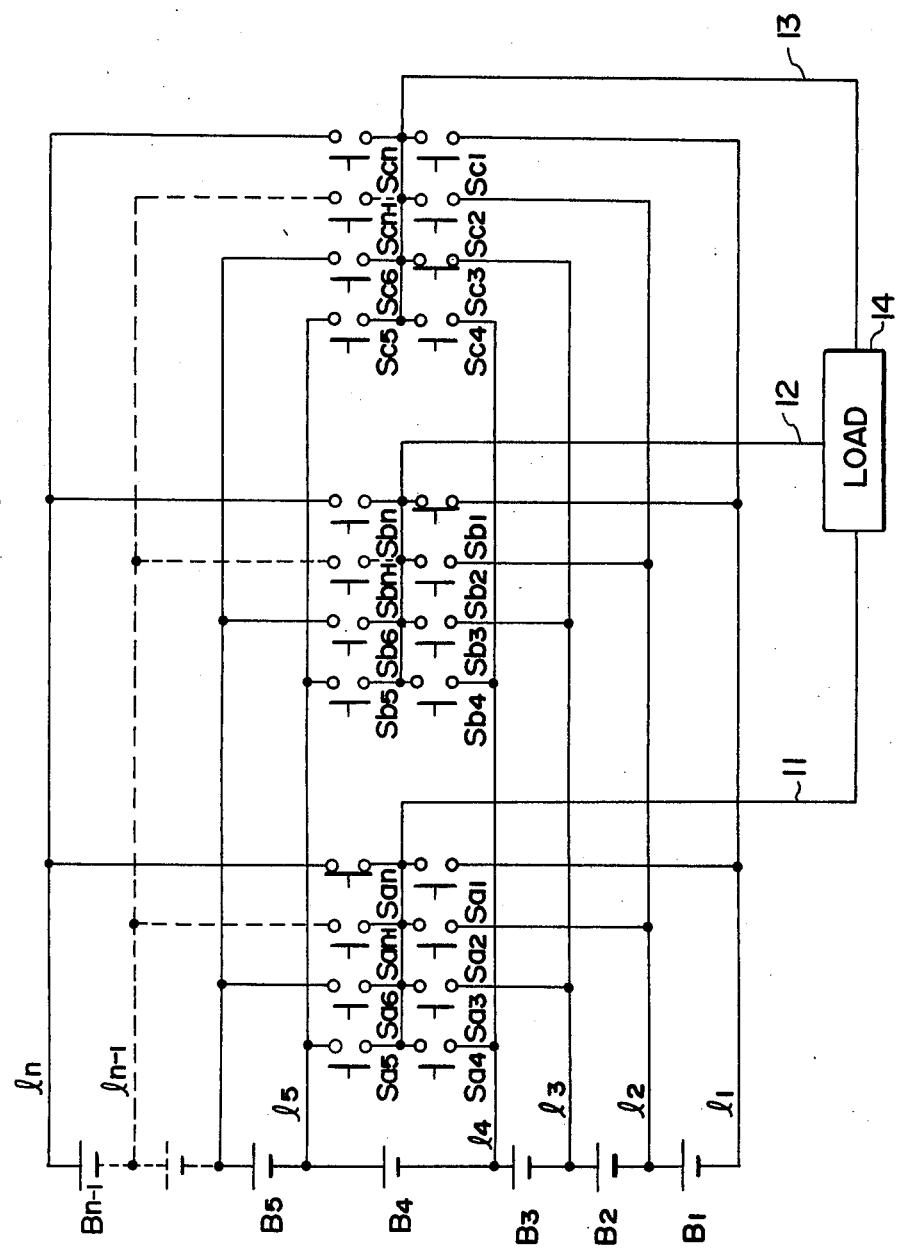
FIG. 9 is a cricuit diagram showing a second embodiment of the present invention.

FIG. 9 is a circuit diagram showing the second embodiment of the present invention. The embodiment shown in the drawing is a three-phase multi-level inverter having a multiple voltage levels. When a number n of voltage levels are required, a number (n−1) of DC power supplies $B_1-B_{n-1}$ are necessary. The number (n−1) of DC power supplies $B_1-B_{n-1}$ are connected to one another in series, output terminals $l_1, l_2 \ldots l_{n-1}$ and $l_n$ are taken out of opposite ends and connecting points of the DC power supplies, and the output terminals are connected thereto with switches $S_{a1}-S_{an-1}$ and $S_{an}$, respectively, as with the embodiment shown in FIG. 3, thereby forming a section of switches for a first phase. Likewise, in a section of switches for a second phase, switches $S_{b1}-S_{bn-1}$ and $S_{bn}$ are connected to one another, and further, in a section of switches for a third phase, switches $S_{c1}-S_{cn-1}$ and $S_{cn}$ are connected to one another. The groups of the sections of switches at the other side are commonly connected, and each of these commonly connected lines 11, 12 and 13 are connected to a load 14.

Figure 2:
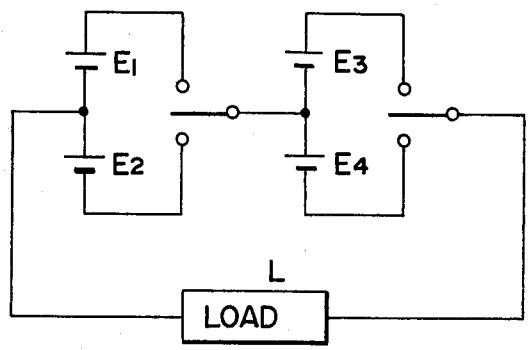
FIG. 2 is a circuit diagram showing another example of the conventional multi-level inverter.

In the present embodiment, the number of DC power supplies B, which are connected to one another in series, is increased, output terminals are taken out of the power supplies thus added, and the switches S are added between the output terminals and the load 14, thereby enabling to easily increase the voltage levels. In passing, in the conventional arrangement shown in FIG. 2, in order to constitute a three-phase inverter having n voltage levels, it has been necessary to use the power supplies (3n−5). Whereas, in the embodiment of the present invention, as few as (n−1) of the DC power supplies will do.

In controlling the inverter, output wave forms of the multi-levels can be obtained only if a single switch coresponding to a desired voltage level is short-circuited. Furthermore, throw-in of switches in such a manner that the output wave forms are phasically shifted from one another by 120° makes it possible to obtain a three-phase alternating current. Similar methods are applicable to easily obtain multi-phase alternating currents other than the three-phase ones. In these circuit arrangements, a single switch per phase will do, thus enabling to minimizing the loss during conversion. For this, the cooling system can be rendered compact in size as in FIG. 7, and, further, forming the section of switches into modules makes it possible to render the section compact in size. The least necessary number of operating batteries required for the output voltage suffices, whereby the output impedance is lowered, so that the conversion efficiency can be improved. By passing, assumption is made that the least unit of voltage is outputted in the present circuit. The switches S to be operated are three switches including $S_{a2}$ (or $S_{a1}$), $S_{b1}$ (or $S_{b2}$) and $S_{c2}$ (or $S_{c1}$), and the DC power supply to be operated is only the battery $B_1$. In contrast thereto, when, in the conventional inverter shown in FIG. 2, the voltage levels thereof are increased to three-phase n voltage levels, it is necessary that the switches S of (3n/2) operate and the DC power supplies B of (3n/2−2), which are connected in series with opposite polarities, operate. For this, charging and discharging must be performed at the same time. Furthermore, in the present embodiment, selection of a DC power supply and a group of switches, which are a power supply and switches different from the above-described ones, in such a manner that a power supply $B_k$ and a switch $S_{ak+1}$ (or $S_{ak}$), $S_{bk}$ (or $S_{bk+1}$) or $S_{ck+1}$ (or $S_{ck}$) makes it possible to obtain an output voltage of the lowest unit in a different mode. This is true of the cases of the output voltages other than the highest output voltages, where there are a plurality of working modes for the former output voltages, respectively. For this, suitable selection of a mode makes it possible to unformly consume the DC power supplies. When some of the DC power supplies or switches are out of order, selection of a mode not using the portion being out of order makes it possible to continue the lowest necessary operation. In the present embodiment, when the DC power supplies are batteries, all the connections are made in series, and further, the batteries are controllable to uniformly discharge, so that the working efficiency during charging and replacement can be improved.

Figure 10:
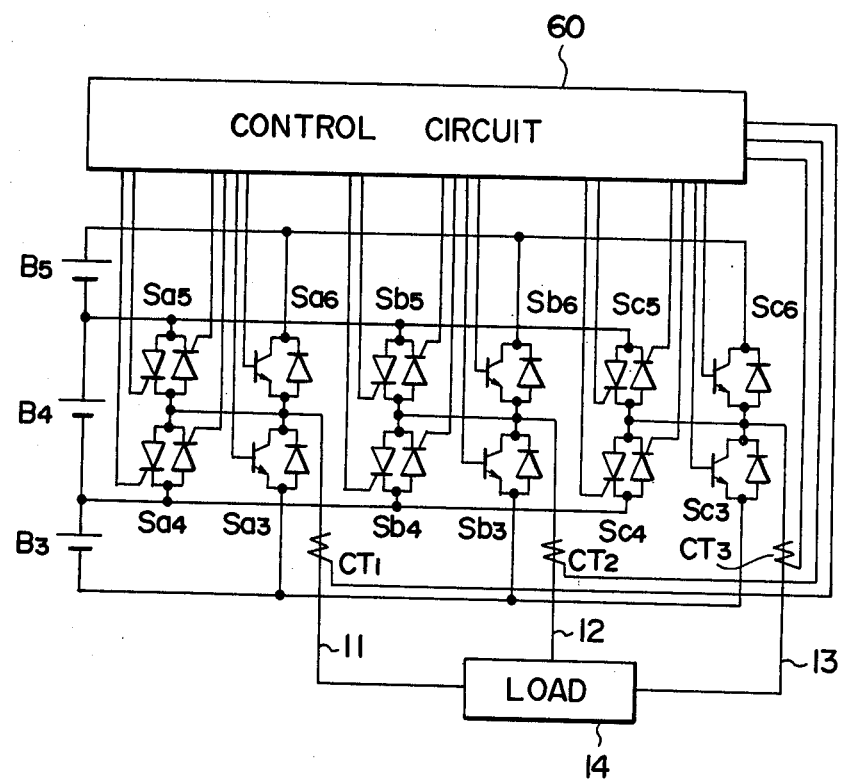
FIG. 10 is a detailed circuit diagram illustrating the embodiment shown in FIG. 9.

FIG. 10 is a detailed circuit diagram specifically showing the embodiment illustrated in FIG. 9. FIG. 10 shows an example in which three DC power supplies ($B_3$, $B_4$ and $B_5$) are provided and the sections of switches are each constituted by four switches. Switches $S_{a3}$, $S_{a6}$, $S_{b3}$, $S_{b6}$, $S_{c3}$ and $S_{c6}$ which are connected to the highest voltage level and the lowest voltage level are each constituted by a transistor and a diode connected in anti-parallel. Switches $S_{a4}$, $S_{a5}$, $S_{b4}$, $S_{b5}$, $S_{c4}$ and $S_{c5}$ other than the aforesaid switches are each constituted by two thyristors connected in anti-parallel. In commutating the thyristors, transistors in the outer section of switches of the group of DC power supplies are operated as auxiliary commutating circuits, whereby forced commutation is effected without requiring any special commutating circuits. Gate control of the respective switches are effected by a control circuit 60, and data for the gate control are obtained through detecting the directions of currents by current transformers $CT_1$, $CT_2$ and $CT_3$ installed on output lines of the respective phases, and respective switching elements are forcedly commutated by a commutating sequence in accordance with the condition immediately before the commutation. In addition, the directions of currents may be judged by detecting polarities of voltages applied to the switching elements. In the present embodiment, the controlling elements being used are transistors and thyristors, thus enabling to reduce production costs of the inverter.

Figure 11:
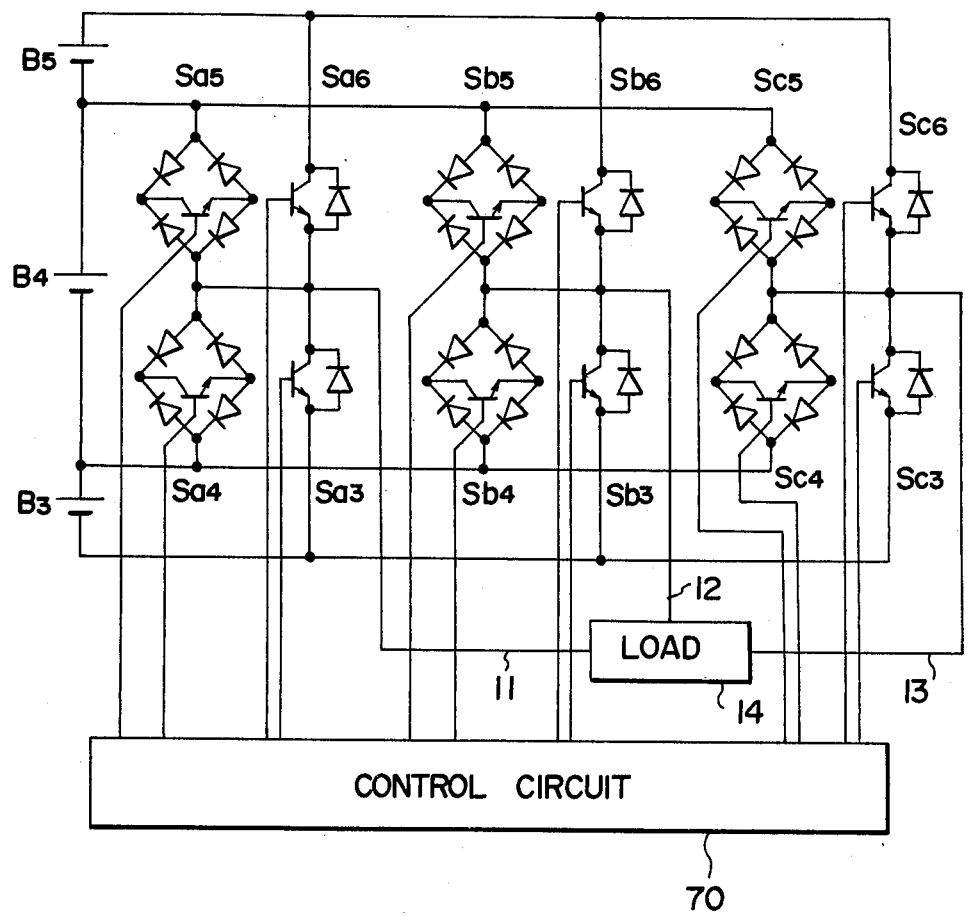
FIG. 11 is another detailed circuit diagram illustrating the embodiment shown in FIG. 9.

FIG. 11 is another detailed circuit diagram specifically showing the embodiment illustrated in FIG. 9. This is the embodiment in which three DC power supplies are used similarly to the one shown in FIG. 10, however, there is difference in arrangement of switches therebetween. Shown in this embodiment is a three-phase multi-level inverter having four voltage levels. Switches connected to the highest voltage level and the lowest voltage level are each constituted by a transistor and a diode connected to each other in anti-parallel as shown in FIG. 10. In contrast thereto, switches ($S_{a4}$, $S_{a5}$, $S_{b4}$, $S_{b5}$, $S_{c4}$ and $S_{c5}$) are each constituted by four diodes bridge-connected to one another, and an output end of the bridge is connected to emitters and collectors of transistors. These switches each having a bridge arrangement are bidirectional. The transistor provided on each switch has its base controlled by a control circuit 70, whereby gate control is effected in a predetermined mode, so that desired voltage levels can be obtained.

Since a transistor and two diodes are connected in series during operation of the switch at the inner side in the present embodiment, such a disadvantage is presented that the voltage drop comes into notice to a slight extent and the efficiency is lowered to some extent. However, all of the controlling elements being used are transistors, such advantages can be offered that production costs can be lowered and operation at high speed can be attained.

Figure 12:
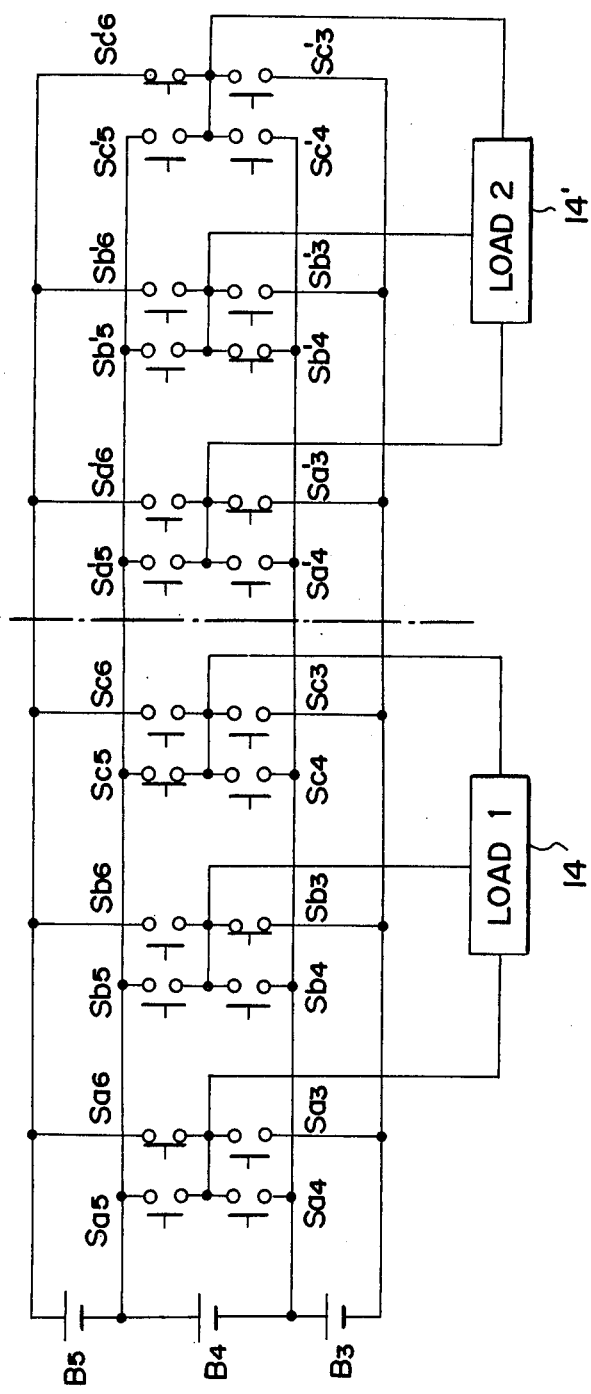
FIG. 12 is a circuit diagram showing a third embodiment of the present invention.

FIG. 12 is a circuit diagram showing the third embodiment of the present invention. Namely, this is an embodiment in which two multi-level inverters distinguished by a chain line are driven under three phases and four voltages. The arrangement shown here corresponds to one in which the arrangement shown in FIG. 9 is changed to obtain four voltage levels. In this arrangement, the sections of switches of the multi-level inverters are commonly connected to respective output terminals of the DC power supplies. Operation thereof is similar to that of the example shown in FIG. 6, in which the respective inverters can be controlled independently of each other.

As has been described hereinabove, if output terminals of the DC power supplies are commonly used, then mere addition of switch circuits makes it possible to additionally provide an inverter without requiring additional provision of reference DC power supplies. Even with the above-described arrangement, the high efficiency and easy maintenance featured by the present invention will not be impaired to any extent.

Figure 13:
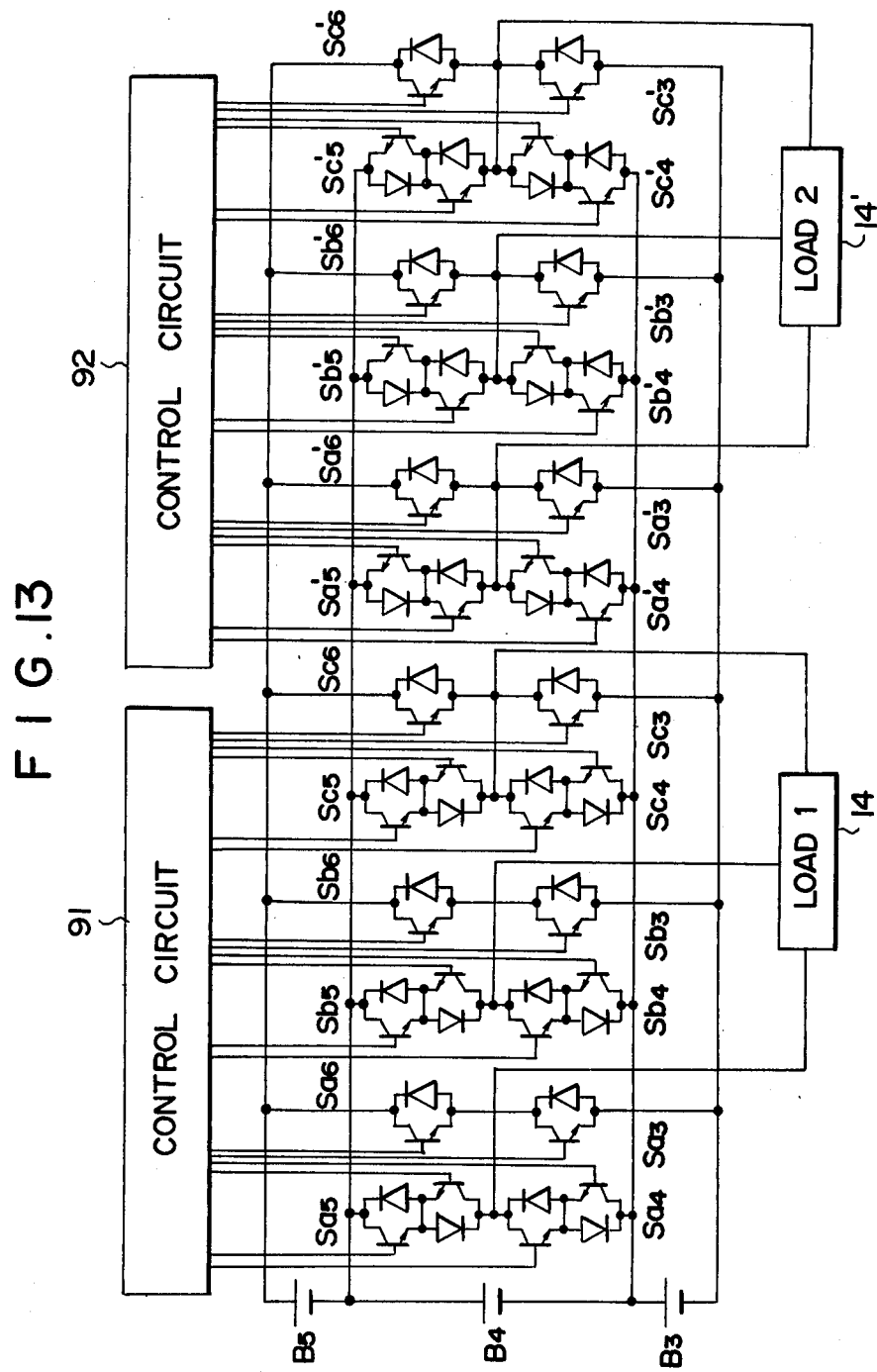
FIG. 13 is a detailed circuit diagram illustrating the embodiment shown in FIG. 12.

FIG. 13 is a circuit diagram specifically showing the embodiment illustrated in FIG. 12. The first inverter is constituted by switches $S_{a3} \sim S_{a6}$, $S_{b3} \sim S_{b6}$ and $S_{c3} \sim S_{c6}$ controlled by a control circuit 91, and drives the first load 14. Furthermore, the second inverter is constituted by switches $S_{a'3} \sim S_{a'6}$, $S_{b'3} \sim S_{b'6}$ and $S_{c'3} \sim S_{c'6}$ controlled by a control circuit 92, and drives a second load 14'. The inverters have the arrangements identical with each other except for some arrangements in switches, the switches connected to the highest voltage level and the lowest voltage level are each constituted by a transistor and a diode connected to each other in anti-parallel as shown in FIGS. 10 and 11. Furthermore, the switches $S_{a4}$, $S_{a5}$, $S_{b4}$, $S_{b5}$, $S_{c4}$, $S_{c5}$, $S'_{a4}$, $S'_{a5}$, $S'_{b4}$, $S'_{b5}$, $S'_{c4}$ and $S'_{c5}$ connected to the voltage levels other than the highest voltage level and the lowest voltage level are each constituted by two transistors whose collectors or emitters are connected in series with opposite polarities diodes are connected in anti-parallel with opposite polarities between the emitter and collector of the respective transistors through diodes. However, the first inverter is different in polarities of connecting points to transistors from the second inverter. Namely, opposite ends of the switches in the first inverter are collectors, whereas opposite ends of the switches in the second inverter are emitters. The former can offer the advantage of commonly using driving circuits of the transistors, and the latter the advantage of commonly utilizing a cooling fin. In each respective transistor, a base of the transistor is controlled in a predetermined sequence to obtain four voltage levels.

In the present embodiment, all of the controlling elements are transistors, so that the production costs of the inverter can be lowered and operation at high speed can be attained. Furthermore, as aforesaid, when an inverter is additionally provided, mere addition of a section of switches makes it possible to additional provision of the inverter without requiring additional provision of batteries, in the present embodiment. For this, the multi-level inverter according to the present invention suitable for use in a case requiring a plurality of loads being operated in parallel, for example, with four wheel drive of an alternating current electric motor vehicle and the like.

In the above-described embodiments, ordinary NPN transistors are used as the transistors constituting the switches, however, the transistors need not be limited to NPN transistors, but may be replaced by PNP transistors, field-effect transistors or any other transistors performing switching functions.

The above-described embodiments show only some of the specific forms and examples of applications, however, use of the switching elements utilized in the embodiments makes it possible to work other specific forms and examples of applications.

What is claimed is:

1. A multi-level inverter comprising:
   an electric power source including at least three DC power supplies serially interconnected with the same polarities;
   a terminal group including a plurality of voltage level terminals formed by providing one voltage level terminal from each end of said power source and a voltage level terminal from each point of interconnection between the power supplies in said series;
   a plurality of switch groups, each switch group including a plurality of on/off switches having input terminals and output terminals, each input terminal in a switch group being coupled to a different one of said voltage level terminals, and the output terminals of each switch group being coupled to one another to form a common output terminal for that switch group; and
   a load having load terminals, each load terminal being connected to the common output terminal of a different switch group.

2. A multi-level inverter as set forth in claim 1 wherein said load is a multi-phase load with each phase having a terminal at opposite ends thereof, the terminal at one end of each phase being connected in common to one another to define a neutral point and the terminal at the opposite end of each phase being connected to the common output terminal of a different one of said plurality of switch groups.

3. A multi-level inverter comprising:
   an electric power source including at least three DC power supplies serially interconnected with the same polarities;
   a terminal group including a plurality of voltage level terminals formed by providing one voltage level terminal from each end of said power source and a voltage level terminal from each point of interconnection between the power supplies in said series;
   a plurality of switch groups, each swtich group including a plurality of on/off switches having input terminals and output terminals, each input terminal in a switch group being coupled to a different one of said voltage level terminals, and the output terminals of each switch group being coupled to one another to form a common output terminal for that switch group; and
   a load having load terminals, each load terminal being connected to the common output terminal of a different switch group and further wherein the number of switch groups is selected to be equal to twice the number of phases in said load to provide a plurality of common output terminals equal to twice the number of phases in said load, each phase having a neutral terminal and a phase terminal and each coupled to a common output terminal of a different one of said switch groups.

4. A multi-level inverter as set forth in claim 1 wherein said load has at least three phases having terminals at opposite ends of each phase, and wherein the number of common output terminals is equal to the number of phases in said load, the terminal at one end of each phase being coupled in common and the terminal at the opposite end of each phase being coupled to a different one of said common output terminals.

5. A multi-level inverter as set forth in claim 2, 15 or 16 wherein said load is a plurality of loads having terminals coupled to a common output terminal of a different one of said plurality of switch groups.

6. A multi-level inverter as set forth in claim 1 wherein the switch in each switch group having its input terminal coupled to the voltage level terminal having the highest voltage level and the switch in each switch group having an input terminal coupled to the voltage level terminal having the lowest voltage level are each formed by a gate-controlled thyristor having an intrinsic turn-off capability and diode coupled in electrical parallel with one another with opposite polarities.

7. A multi-level inverter as set forth in claim 1 wherein the switch in each switch group having an input terminal coupled to the voltage level terminal having the highest voltage level and the switch in each switch group having an input terminal coupled to the voltage level terminal having the lowest voltage level are formed by the anti-parallel interconnection of a transistor and diode.

8. A multi-level inverter as set forth in claim 1 wherein the switches in each switch group, except for those switches having an input terminal coupled to the voltage level terminal having the highest voltage level and the voltage level terminal having the lowest voltage level, are each formed by two gate controlled thyristors having an intrinsic turn-off capability coupled in parallel with one another with opposite polarities.

9. A multi-level inverter as set forth in claim 1 wherein each switch of said switch group, except for the switches having input terminals coupled to the voltage level terminal having the highest voltage level and the voltage level terminal having the lowest voltage level, are each formed by two gate controlled thyristors without intrinsic turn-off which are connected in parallel with one another with opposite polarities.

10. A multi-level inverter as set forth in claim 1 wherein the switches of each switch group, except for the switches having input terminals coupled to a voltage level terminal having the highest voltage level and a voltage level terminal having the lowest voltage level, are each formed by the serial interconnection of two circuits wherein each circuit is formed by a transistor and diode coupled in anti-parallel arrangement and wherein the serial interconnection is with opposite polarities.

11. A multi-level inverter as set forth in claim 1 wherein the switches of each switch group, except for the switches having input terminals coupled to the voltage level terminal having the highest voltage level and the voltage level terminal having the lowest voltage level are each formed as a diode bridge, each diode bridge having two output terminals and a transistor having a collector coupled to one output terminal of the bridge and an emitter coupled to the other output terminal of the bridge.

12. A multi-level inverter as set forth in claim 1 wherein said DC power supplies are batteries.

13. A multi-level inverter as set forth in claim 1 wherein said load includes phases having terminals at each end thereof, each phase being separately arranged such that each terminal of each phase is coupled to a different one of said common output terminals.

* * * * *